(12) United States Patent
Castellanos Zamora et al.

(10) Patent No.: US 8,782,743 B2
(45) Date of Patent: Jul. 15, 2014

(54) METHODS AND APPARATUS FOR USE IN A GENERIC BOOTSTRAPPING ARCHITECTURE

(75) Inventors: David Castellanos Zamora, Madrid (ES); Nuria Esteban Vares, Aranjuez (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 13/505,771

(22) PCT Filed: Nov. 24, 2009

(86) PCT No.: PCT/EP2009/065718
§ 371 (c)(1),
(2), (4) Date: May 3, 2012

(87) PCT Pub. No.: WO2011/063826
PCT Pub. Date: Jun. 3, 2011

(65) Prior Publication Data
US 2012/0222091 A1    Aug. 30, 2012

(51) Int. Cl.
*H04L 29/06*    (2006.01)
*G06F 21/00*    (2013.01)

(52) U.S. Cl.
USPC ............... 726/3; 713/153; 713/155; 455/411

(58) Field of Classification Search
USPC .................. 726/3, 4; 455/411; 713/153, 155
See application file for complete search history.

(56) References Cited

U.S. PATENT DOCUMENTS

2008/0171534 A1*  7/2008  Holtmanns et al. ........... 455/411

FOREIGN PATENT DOCUMENTS

WO   WO 2008/084135      7/2008
WO   WO 2012094879 A1 *  7/2012

OTHER PUBLICATIONS

Mohamed Abid, Songbo Song, Hassnaa Moustafa, Hossam Afifi; "Efficient identity-based authentication for IMS based services access"; Dec. 2009; MoMM '09: Proceedings of the 7th International Conference on Advances in Mobile Computing and Multimedia; Publisher: ACM; pp. 260-266.*

International Search Report for PCT/EP2009/065718, mailed Aug. 3, 2010.

International Preliminary Report on Patentability for PCT/EP2009/065718, mailed Aug. 3, 2010.

"Generic Boostrapping Architecture (GBA) Framework", 3rd Generation Partnership Project (3GPP), vol. 3GPP2, S. S0109-0, (Mar. 30, 2006), pp. 1-59.

* cited by examiner

*Primary Examiner* — Hadi Armouche
*Assistant Examiner* — Courtney Fields
(74) *Attorney, Agent, or Firm* — Nixon & Vanderhye P.C.

(57) ABSTRACT

According to an aspect of the present invention there is provided a method of obtaining authentication information for use in a Generic Bootstrapping Architecture, GBA, employed in a network with one or more GBA-capable subscriber registers and one or more GBA-incapable subscriber registers. The method involves a selection function for determining whether the authentication information of a subscriber is stored at a GBA-capable subscriber register or at a GBA-incapable subscriber register, and an inter working function for translating between the Diameter messages of the Zh interface and the MAP messages of the Zh' interface.

11 Claims, 8 Drawing Sheets

METHODS AND APPARATUS FOR USE IN A GENERIC BOOTSTRAPPING ARCHITECTURE

This application is the U.S. national phase of the International Application No. PCT/EP2009/065718, filed 24 Nov. 2009, which designated the U.S., the entire contents of which is hereby incorporated by reference.

TECHNICAL FIELD

The present invention relates to methods and apparatus for use in a Generic Bootstrapping Architecture. More particularly, the invention relates to methods and apparatus for obtaining subscriber authentication information.

BACKGROUND

In order to facilitate the provision of services to user terminals, a mobile network such as a 3G network will often require the establishment of a secure communication channel or "security association" between client terminals (i.e. mobile terminals) and the network-based service nodes which provide the services. The Generic Bootstrapping Architecture (GBA) defined in the 3GPP Technical Specification TS 33.220 provides a mechanism whereby a client terminal (UE) can be authenticated to a Network Authentication Function (NAF) (i.e. an Application Server), and secure session keys obtained for use between the client terminal and the NAF. FIG. 1 illustrates schematically an example of the simple network model for the GBA, as described in 3GPP TS 33.220, which comprises a Bootstrapping Server Function (BSF), a Network Authentication Function (NAF), a Subscriber Locator Function (SLF), a Home Subscriber System (HSS) and the User Equipment (UE).

The GBA architecture provides a mechanism to bootstrap the Authentication and Key Agreement (AKA) for application security from the 3GPP AKA mechanism described in 3GPP TS 33.102. This mechanism allows a UE to be authenticated to a BSF in the home network on the basis of a secret K which is shared between the USIM of the UE and the HSS of the subscriber's home network. The AKA procedure further establishes session keys from which keys are derived that are afterwards applied between the UE and a NAF. When a UE and NAF wish to obtain session keys from the BSF, the NAF sends a transaction identifier to the BSF, the transaction identifier containing an index which the BSF uses to identify the UE and appropriate keys which it forwards to the NAF.

FIG. 2 illustrates an example signalling flow diagram of the bootstrapping mechanism provided by the GBA. The steps performed are as follows:

A1. A UE initiates the key generation process by sending a bootstrapping request containing a user identity (e.g. the IMPI obtained from the IMSI stored on a USIM, or the IMPI stored on an ISIM) to the BSF over the Ub interface. The UE derives the address of the appropriate BSF from the user identity as outlined in 3GPP TS23.003.

A2. In a multiple HSS environment, the BSF may have to obtain the address of the HSS where the subscription of the user is stored by querying the SLF over the Dz interface. To get the HSS identity the BSF sends the Zh request normally destined to the HSS to a pre-configured SLF.

A3. The SLF then determines the HSS identity and sends a response redirecting the BSF towards the HSS identified in the Redirect-Host AVP. Steps A2 and A3 are not required in a single HSS environment.

A4. The BSF then sends authentication request in the form of a Multimedia-Auth-Request (MAR) message to the identified HSS over the Zh interface.

A5. The HSS then sends an authentication response in the form of a Multimedia-Auth-Answer (MAA) message including an Authentication Vector (AV) for the user. Each AV is comprised of a random number (RAND), an expected response (XRES), a cipher key (CK), an integrity key (IK) and an authentication token (AUTN). The BSF may also retrieve the GBA User Security Settings (GUSS) for the subscriber from the HSS. The GUSS can contain the BSF specific information element and the set of all application-specific User Security Settings (USS), such as user-specific key lifetimes and the type of UICC of the user. A USS is an application and subscriber specific parameter set that defines two parts, an authentication part, which contains the list of identities of the user needed for the application (e.g. IMPUs, MSISDN, pseudonyms), and an authorisation part, which contains the user permission flags (e.g. access to application allowed, type of certificates which may be issued).

A6. The BSF forwards the RAND and AUTN to the UE in a 401 Unauthorised response message (without the CK, IK and XRES). In doing so the BSF requests that the UE authenticate itself.

A7. The UICC of the UE checks AUTN using the shared secret K to verify that the challenge is from an authorised network. The UE also calculates CK, IK and RES using the RAND. This will result in session keys IK and CK being known in both the BSF and the UE.

A8. The UE returns the Digest AKA response (RES), to the BSF.

A9. The BSF authenticates the UE by verifying the Digest AKA response, comparing RES with XRES. The BSF also generates key material Ks by concatenating CK and IK, and generates a bootstrapping transaction identifier (B-TID) that binds the user identity to the keying material Ks. The B-TID is generated in the format of a Network Access Identifier (NAI) by taking the base 64 encoded RAND value and combining this encoded value with the BSF server name. For example, the B-TID may take the form:
base64encode(RAND)@BSF_servers_domain_name A10. The BSF sends a 200 OK message, including the B-TID, to the UE to indicate the success of the authentication. In addition, the BSF supplies the lifetime of the key Ks.

A11. The UE also generates the key material Ks by concatenating CK and IK.

A12. Subsequently, the UE starts communication with a NAF over the Ua interface, and establishes that GBA procedures are to be used between them. The UE supplies the B-TID to the NAF to allow the NAF to retrieve the corresponding keys from the BSF.

A13. The UE derives the key Ks_NAF from Ks and the NAF_Id using a Key Derivation Function (KDF). The NAF_Id is the FQDN of the NAF, concatenated with the Ua security protocol identifier.

A14. The NAF sends a request for key material to the BSF over the Zn interface. The request includes the B-TID received from the UE and the NAF_Id.

A15. The BSF derives the Ks_NAF from Ks and the NAF_Id using the same Key Derivation Function (KDF). The BSF then supplies Ks_NAF to the NAF.

A16. The NAF stores the Ks_NAF which can then be used to secure communications between the UE and the NAF.

After the GBA mechanism has been run for the first time, subsequent requests to establish a security association between the UE and the same or a different NAF may use the already established key material Ks, providing that key has not expired. However, this will still require that the UE initiate a request for establishment of a security association by sending its B-TID to the NAF.

3GPP TS 33.220 also defines a network model for the GBA in scenarios in which, instead of a GBA-capable HSS, there is either a HLR or a HSS that does not support the GBA. FIG. 3 illustrates schematically an example of the simple network model for the GBA when either a HLR or a HSS without Zh interface support is deployed. In this case, the BSF supports a Zh' interface that implements the Mobile Application Part (MAP) SS7 protocol with the GBA-incapable HSS/HLR, and uses the MAP_SEND_AUTHENTICATION_INFO service in order to obtain the AV for the subscriber. MAP_SEND_AUTHENTICATION_INFO request primitives include the subscriber's IMSI, which is composed of the Mobile Country Code (MCC) consisting of three digits that uniquely identify the country of domicile of the mobile subscriber, the Mobile Network Code (MNC) consisting of two or three digits for GSM/UMTS applications that identifies the home PLMN of the mobile subscriber, and the Mobile Subscriber Identification Number (MSIN) identifying the mobile subscriber within a PLMN. The MAP_SEND_AUTHENTICATION_INFO request can therefore be routed to the appropriate HLR/HSS using the information contained in the subscriber's IMSI. However, the IMPI is used in the request sent by the UE to the BSF over the Ub interface. As such, the BSF derives the subscriber's IMSI from the IMPI prior to sending a request to a GBA-incapable HLR/HSS over the Zh' interface (see 3GPP TS29.109).

In such circumstances, a GBA-incapable HLR/HSS will not support GUSS such that GUSS information is not sent over Zh' reference point. If GUSS support is required, then this can be achieved, for instance, by storing the GUSS information in a BSF database (which can be internal and/or external to the entity itself), or in any other network database which is deemed as appropriate for a specific deployment.

According to 3GPP TS 33.220, in systems where only GBA-capable HSSs or GBA-incapable HSSs/HLRs are deployed, then a BSF is configured to use either the Zh or Zh' interface, and not both. However, there could be scenarios during migration, where both GBA-capable HSSs and GBA-incapable HSSs/HLRs are deployed. For example, network operators are likely to apply a step-wise approach to upgrading networks that do not support GBA whereby, in a first step, only a single BSF and one or a few GBA-capable HSSs would be introduced. Subsequently, the rest of HSSs in the network would be upgraded to support GBA. However, any remaining GBA-incapable HSSs/HLRs may remain active throughout this process.

Alternatively, in a network which supports the Zh' interface, the network operator may upgrade or introduce only one or a few HSSs to support the Zh interface, whilst the remaining HSSs/HLRs are not upgraded or replaced and continue to use the Zh' interface. Such circumstances are likely to occur as subscriber register/database infrastructures evolve to support new services and types of access. For example, while 2G users may continue to be managed in legacy HLRs, new GBA-capable HSSs may be introduced to support IMS or LTE subscribers.

In these migration scenarios where some but not all of the HLRs/HSSs have been upgraded to support GBA then, without some mechanism for handling this, then GBA will not be available for all subscribers of that network. Depending upon whether the BSF supports the Zh or Zh' interface, GBA would only be available either for subscribers whose AV is stored within a GBA-capable HSS, or for subscribers whose AV is stored within a GBA-incapable HLR/HSS.

3GPP TS 33.220 suggests that, during migration from HLRs or HSSs without Zh reference point support to HSS with Zh reference point support, the BSF could be configured with the information required to select between HSSs and HLRs for a subscriber, as illustrated in FIG. 4. Furthermore, 3GPP TS 33.220 also states that such a mechanism involving configuration of the BSF will not be standardized. However, this approach has a number of problems. The BSF, which is normally user unaware (i.e. does not permanently store any user data), would be required to store and check configuration information relating to subscribers in order to achieve user identity resolution and to support the GUSS. As such, the network operator would be required to maintain configuration information within yet another network element, leading to increased operating expenditure (OPEX) and capital expenditure (CAPEX). In addition, the BSF would be required to support both the Zh interface (Diameter) and the Zh' interface (MAP).

SUMMARY

It is an object of the present invention to overcome, or at least mitigate the problems identified above. This object is achieved by providing a selection function for determining whether the subscribers authentication information is stored at a GBA-capable subscriber register or at a GBA-incapable subscriber register, and therefore whether the Bootstrapping Server Function must use the Zh or Zh' interface for a particular subscriber, and an inter working function for translating between the Diameter messages of the Zh interface and the MAP messages of the Zh' interface when required.

According to a first aspect of the present invention there is provided a method of obtaining authentication information for use in a Generic Bootstrapping Architecture, GBA, employed in a network with one or more GBA-capable subscriber registers and one or more GBA—incapable subscriber registers. The method comprises at a Bootstrapping Server Function, upon receipt of a bootstrapping request from a subscriber terminal, sending an authentication request for authentication information including an identity of a subscriber to a selection function;

at the selection function, determining if the authentication information of the subscriber is stored at one of the one or more GBA-capable subscriber registers or at one of the one or more GBA-incapable subscriber registers;

if it is determined that the authentication information of the subscriber is stored at one of the one or more GBA-incapable subscriber registers, communicating the authentication request to an inter working function; and at the inter working function, sending a Mobile Application Part, MAP, protocol message corresponding to the authentication request towards the GBA-incapable subscriber register, receiving a MAP response from the GBA-incapable subscriber register, and sending an authentication response corresponding to the received MAP response to the Bootstrapping Server Function.

Both the selection function and the inter working function may be provided at one of the one or more GBA-capable subscriber registers. Alternatively, both the selection function and the inter working function may be provided at a Subscriber Locator Function. The step of communicating the determination to an inter working function may then comprise, at the selection function, forwarding the authentication request to the inter working function.

Alternatively, the inter working function may be provided at the Bootstrapping Server Function or at one of the one or more GBA-capable subscriber registers, and the selection function may be provided at a Subscriber Locator Function. The step of communicating the authentication request to an inter working function may then comprise:

- at the selection function, sending to the Bootstrapping Server Function an indication that the authentication information of the subscriber is stored at one of the one or more GBA-incapable subscriber registers; and
- at the Bootstrapping Server Function, forwarding/resending the authentication request to the inter working function.

The step of determining if the authentication information of the subscriber is stored at one of the one or more GBA-capable subscriber registers or at one of the one or more GBA-incapable subscriber registers may comprise:

- determining if the authentication information of the subscriber is stored at one of the one or more GBA-capable subscriber registers; and
- if not, implicitly determining that the authentication information of the subscriber is stored at one of the one or more GBA-incapable subscriber registers.

Alternatively, the step of determining if the authentication information of the subscriber is stored at one of the one or more GBA-capable subscriber registers may comprise:

- determining if the subscriber identity can be resolved to a GBA-capable subscriber register storing the subscriber's authentication information.

The step of sending, to the Bootstrapping Server Function, an indication that the authentication information of the subscriber is stored at one of the one or more GBA-incapable subscriber registers may comprise sending an indication that the authentication information of the subscriber is not stored at one of the one or more GBA-capable subscriber registers. The step of sending an indication that the authentication information of the subscriber is not stored at one of the one or more GBA-capable subscriber registers may further comprise sending a Diameter response including an unsuccessful result code. An unsuccessful result code may be an explicit indication of error carried out with a new indication on the Zh' interface, or may be an implicit indication of an error using an existing result code such as that indicating an 'unknown user'.

If it is determined that the authentication information of the subscriber is stored at one of the one or more GBA-incapable subscriber registers, then the method may further comprise, retrieving the subscribers GBA User Security Settings, GUSS, from one of the selection function and the inter working function. The GUSS maybe stored at either the entity providing the selection function or the entity providing the inter working function.

The GBA-capable subscriber registers may be Home Subscriber Servers supporting Diameter protocol and capable of communicating with the Bootstrapping Server Function, and the GBA-incapable subscriber registers may be Home Subscriber Servers or Home Location Registers supporting MAP protocol and incapable of communicating with the Bootstrapping Server Function.

According to a second aspect of the present invention there is provided an apparatus configured to operate as a Bootstrapping Server Function for use in a Generic Bootstrapping Architecture, GBA, employed in a network with one or more GBA-capable subscriber registers and one or more GBA— incapable subscriber registers. The apparatus comprises:

- a first receiver for receiving a bootstrapping request from a subscriber terminal in use by a subscriber;
- a sender for sending an authentication request for authentication information, including an identity of the subscriber, to a selection function; and
- a second receiver for receiving an authentication response from an inter working function including the subscriber authentication information obtained from one of the one or more GBA-incapable subscriber register.

According to this embodiment, the selection function and the inter working function may be provided at a Subscriber Locator Function. Alternatively, the selection function and the inter working function are provided at a GBA-capable subscriber register.

According to a third aspect of the present invention there is provided an apparatus configured to operate as a Bootstrapping Server Function for use in a Generic Bootstrapping Architecture, GBA, employed in a network with one or more GBA-capable subscriber registers and one or more GBA— incapable subscriber registers, The apparatus comprises:

- a first receiver for receiving a bootstrapping request from a subscriber terminal;
- a first sender for sending an authentication request for authentication information including an identity of the subscriber to a selection function;
- a second receiver for receiving, from the selection function, an indication that the authentication information of the subscriber is stored at one of the one or more GBA-incapable subscriber registers;
- a processor arranged to translate the authentication request into a corresponding Mobile Application Part, MAP, protocol message;
- a second sender for sending the MAP protocol message corresponding to the authentication request towards one of the one or more GBA-incapable subscriber registers;
- a third receiver for receiving a MAP protocol response from the GBA-incapable subscriber register including the subscriber authentication information; and
- the processor being further arranged to translate the MAP response into a corresponding authentication response.

According to this embodiment, this apparatus provides the inter working function at the Bootstrapping Server Function, whilst the selection function may be provided at a Subscriber Locator Function.

According to a fourth aspect of the present invention there is provided an apparatus configured to operate as a Bootstrapping Server Function for use in a Generic Bootstrapping Architecture, GBA, employed in a network with one or more GBA-capable subscriber registers and one or more GBA— incapable subscriber registers, The apparatus comprises:

- a first receiver for receiving a bootstrapping request from a subscriber terminal;
- a first sender for sending an authentication request for authentication information including an identity of the subscriber to a selection function;
- a second receiver for receiving, from the selection function, an indication that the authentication information of the subscriber is stored at one of the one or more GBA-incapable subscriber registers;
- a second sender for forwarding the authentication request to an inter working function; and
- a third receiver for receiving an authentication response from the inter working function including the subscriber authentication information obtained from the GBA-incapable subscriber register.

According to this embodiment, the selection function may be provided at a Subscriber Locator Function. The inter working function may then be provided as a separate entity or at a GBA-capable subscriber register.

According to a fifth aspect of the present invention there is provided an apparatus configured to operate as an inter working function for use in a Generic Bootstrapping Architecture, GBA, employed in a network comprised of one or more GBA—incapable subscriber registers. The apparatus comprises:

a first receiver for receiving, from a Bootstrapping Server Function, an authentication request for authentication information including an identity of a subscriber;
a processor arranged to translate the authentication request into a corresponding Mobile Application Part, MAP, protocol message;
a first sender for sending the MAP protocol message corresponding to the authentication request towards one of the one or more GBA-incapable subscriber registers;
a second receiver for receiving a MAP protocol response from the GBA-incapable subscriber register including the subscriber authentication information;
the processor being further arranged for to translate the MAP response into a corresponding authentication response; and
a second sender for sending the authentication response corresponding to the received MAP response to the Bootstrapping Server Function.

According to this embodiment, the inter working function can either be provided as a separate network entity or at a GBA-capable subscriber register.

According to a sixth aspect of the present invention there is provided an apparatus configured to operate as a Subscriber Locator Function for use in a Generic Bootstrapping Architecture, GBA, employed in a network with one or more GBA-capable subscriber registers and one or more GBA—incapable subscriber registers. The apparatus comprises:

a receiver for receiving, from a Bootstrapping Server Function, an authentication request for authentication information including an identity of a subscriber;
a processor arranged to determine if the authentication information of the subscriber is stored at one of the one or more GBA-capable subscriber registers or at one of the one or more GBA-incapable subscriber registers; and
a sender for sending an authentication response to the Bootstrapping Server Function.

According to this embodiment the selection function is provided at the Subscriber Locator Function. The inter working function may then also be implemented at the Subscriber Locator Function or may be implemented at a separate entity.

If the inter working function is implemented at a separate entity, and it is determined that the authentication information of the subscriber is stored at one of the one or more GBA-incapable subscriber registers, then the response may include an indication that the authentication information of the subscriber is stored at one of the one or more GBA-incapable subscriber registers.

Alternatively, if the inter working function were also implemented at the Subscriber Locator Function, and it is determined that the authentication information of the subscriber is stored at one of the one or more GBA-incapable subscriber registers, then the apparatus may further comprise:

a processor arranged to translate the authentication request into a corresponding Mobile Application Part, MAP, protocol message;
a sender for sending the MAP protocol message corresponding to the authentication request towards the GBA-incapable subscriber register;
a receiver for receiving a MAP response from the GBA-incapable subscriber register including the subscriber authentication information; and
the processor being further arranged for to translate the MAP response into a corresponding authentication response.

According to a seventh aspect of the present invention there is provided an apparatus configured to operate as a subscriber register that is capable of supporting a Generic Bootstrapping Architecture, GBA, and employed in a network together with one or more GBA—incapable subscriber registers. The apparatus comprises:

a first receiver for receiving, from a Bootstrapping Server Function, an authentication request for authentication information including an identity of a subscriber;
a processor arranged to determine if the authentication information of the subscriber is stored at a GBA-capable subscriber register or at one of the one or more GBA-incapable subscriber registers and, if it is determined that the authentication information of the subscriber is stored at one of the one or more GBA-incapable subscriber registers, to translate the authentication request into a corresponding Mobile Application Part, MAP, protocol message; and
a first sender for sending the MAP protocol message corresponding to the authentication request towards the GBA-incapable subscriber register;
a second receiver for receiving a MAP response from the GBA-incapable subscriber register;
the processor being further arranged to translate the MAP response into a corresponding authentication response; and
a second sender for sending a the authentication response corresponding to the received MAP response to the Bootstrapping Server Function.

According to this embodiment a GBA-capable subscriber register may be provided with both the selection function and the inter working function.

Whilst the above embodiments refer to more than one sender, and to more than one receiver, it should be noted that these may equally be implemented as a single sender providing the function of all of the senders, and a single receiver providing the function of all of the receivers, as well as other arrangements where a sender and a receiver are combined in a single unit communicating with one or more entities.

According to an eighth aspect of the present invention there is provided method of operating a Bootstrapping Server Function for use in a Generic Bootstrapping Architecture, GBA, employed in a network with one or more GBA-capable subscriber registers and one or more GBA—incapable subscriber registers. The method comprises:

upon receipt of a bootstrapping request from a subscriber terminal, sending an authentication request for authentication information including an identity of a subscriber to a selection function; and
receiving an authentication response from an inter working function including the subscriber authentication information obtained from one of the one or more GBA-incapable subscriber register.

The selection function and the inter working function may be provided at a Subscriber Locator Function. Alternatively, the selection function and the inter working function may be provided at a GBA-capable subscriber register.

According to a ninth aspect of the present invention there is provided method of operating a Bootstrapping Server Function for use in a Generic Bootstrapping Architecture, GBA, employed in a network with one or more GBA-capable subscriber registers and one or more GBA—incapable subscriber registers. The method comprises:

upon receipt of a bootstrapping request from a subscriber terminal, sending an authentication request for authentication information including an identity of a subscriber to a selection function;

receiving from the selection function an indication that the authentication information of the subscriber is stored at one of the one or more GBA-incapable subscriber registers;

forwarding the authentication request to an inter working function; and receiving an authentication response from the inter working function including the subscriber authentication information obtained from the GBA-incapable subscriber register.

The selection function may be provided at a Subscriber Locator Function, and the inter working function may be provided at a GBA-capable subscriber register.

According to a tenth aspect of the present invention there is provided method of operating an inter working function for use in a Generic Bootstrapping Architecture, GBA, employed in a network comprised of one or more GBA—incapable subscriber registers. The method comprises:

receiving from a Bootstrapping Server Function, an authentication request for authentication information including an identity of a subscriber;

sending a Mobile Application Part, MAP, protocol message corresponding to the authentication request towards one of the one or more GBA-incapable subscriber registers;

receiving a MAP response from the GBA-incapable subscriber register including the subscriber authentication information, and sending an authentication response corresponding to the received MAP response to the Bootstrapping Server Function.

According to an eleventh aspect of the present invention there is provided method of operating a Subscriber Locator Function for use in a Generic Bootstrapping Architecture, GBA, employed in a network with one or more GBA-capable subscriber registers and one or more GBA—incapable subscriber registers. The method comprises:

receiving from a Bootstrapping Server Function, an authentication request for authentication information including an identity of a subscriber;

determining if the authentication information of the subscriber is stored at one of the one or more GBA-capable subscriber registers or at one of the one or more GBA-incapable subscriber registers; and if it is determined that the authentication information of the subscriber is stored at one of the one or more GBA-incapable subscriber registers, sending a Mobile Application Part, MAP, protocol message corresponding to the authentication request towards the GBA-incapable subscriber register, receiving a MAP response from the GBA-incapable subscriber register, and sending an authentication response corresponding to the received MAP response to the Bootstrapping Server Function.

According to a twelfth aspect of the present invention there is provided method of operating a Subscriber Locator Function for use in a Generic Bootstrapping Architecture, GBA, employed in a network with one or more GBA-capable subscriber registers and one or more GBA—incapable subscriber registers. The method comprises:

receiving from a Bootstrapping Server Function, an authentication request for authentication information including an identity of a subscriber;

determining if the authentication information of the subscriber is stored at one of the one or more GBA-capable subscriber registers or at one of the one or more GBA-incapable subscriber registers; and if it is determined that the authentication information of the subscriber is stored at one of the one or more GBA-incapable subscriber registers, sending to the Bootstrapping Server Function an indication that the authentication information of the subscriber is stored at one of the one or more GBA-incapable subscriber registers.

According to a thirteenth aspect of the present invention there is provided method of operating a subscriber register that is capable of supporting a Generic Bootstrapping Architecture, GBA, and employed in a network together with one or more GBA—incapable subscriber registers. The method comprises:

receiving from a Bootstrapping Server Function, an authentication request for authentication information including an identity of a subscriber;

determining if the authentication information of the subscriber is stored at a GBA-capable subscriber register or at one of the one or more GBA-incapable subscriber registers; and if it is determined that the authentication information of the subscriber is stored at one of the one or more GBA-incapable subscriber registers, sending a Mobile Application Part, MAP, protocol message corresponding to the authentication request towards the GBA-incapable subscriber register, receiving a MAP response from the GBA-incapable subscriber register, and sending an authentication response corresponding to the received MAP response to the Bootstrapping Server Function.

According to a fourteenth aspect of the present invention there is provided method of operating a subscriber register that is capable of supporting a Generic Bootstrapping Architecture, GBA, and employed in a network together with one or more GBA-incapable subscriber registers. The method comprises:

receiving from a Bootstrapping Server Function, an authentication request for authentication information including an identity of a subscriber;

sending a Mobile Application Part, MAP, protocol message corresponding to the authentication request towards one of the one or more GBA-incapable subscriber registers;

receiving a MAP response from the GBA-incapable subscriber register including the subscriber authentication information, and sending an authentication response corresponding to the received MAP response to the Bootstrapping Server Function.

DETAILED DESCRIPTION

There will now be described a method of implementing both legacy GBA-incapable HSSs/HLRs and GBA-capable HSSs within a network, thereby allowing the network operator to gradually migrate their networks from the legacy GBA-incapable HSSs/HLRs to GBA-capable HSSs. This method involves a Selection Function for determining whether the subscribers authentication information is stored at a GBA-capable HSS or at a GBA-incapable HSS/HLR, and therefore whether the BSF must use the Zh or Zh' interface for a particular subscriber, and an Inter Working Function (IWF) for translating between the Diameter messages of the Zh interface and the MAP messages of the Zh' interface when required.

In scenarios where multiple and separately addressable GBA-capable HSSs and GBA-incapable HSSs/HLRs have been deployed by the network operator, it is proposed here to configure the BSF such that it always queries the Selection Function after receiving a bootstrapping request. The Selection Function would then determine if the subscriber's authentication information is stored at a GBA-capable HSS or at a GBA-incapable HLR/HSS. If the Selection Function determines that the subscriber's authentication information is stored at a GBA-capable HSS, then a request for authentication would be routed to the HSS identified by the Selection Function. However, if the Selection Function were to determine that the subscriber's authentication information is stored at a GBA-incapable HLR/HSS, then the authentication request would be routed to an Inter Working Function.

The Inter Working Function would then translate the authentication request into a corresponding MAP protocol message, and would send the MAP message to the GBA-incapable HLR/HSS over the Zh' interface. The MAP message would be routed to the appropriate HLR/HSS using the subscriber's IMSI. The Inter Working Function would then receive a MAP response message from the GBA-incapable HLR/HSS and would translate this MAP message into the corresponding authentication response. The Inter Working Function would then return the authentication response to the BSF.

The introduction of a Selection Function separate from the BSF would provide support for multiple and separately addressable GBA-capable HSSs and GBA-incapable HSSs/HLRs. This solution also provides that the BSF does not need to be configured with this information, and therefore leads to a reduction in OPEX/CAPEX and increased efficiency when compared to the configuration in the BSF as currently proposed in the 3GPP standards. In addition, whilst the Inter Working Function (IWF) could be provided with or collocated at the BSF, the introduction of an IWF separate from the BSF would provide that the BSF does not need to support the MAP protocol for the Zh' interface.

Figure 1:
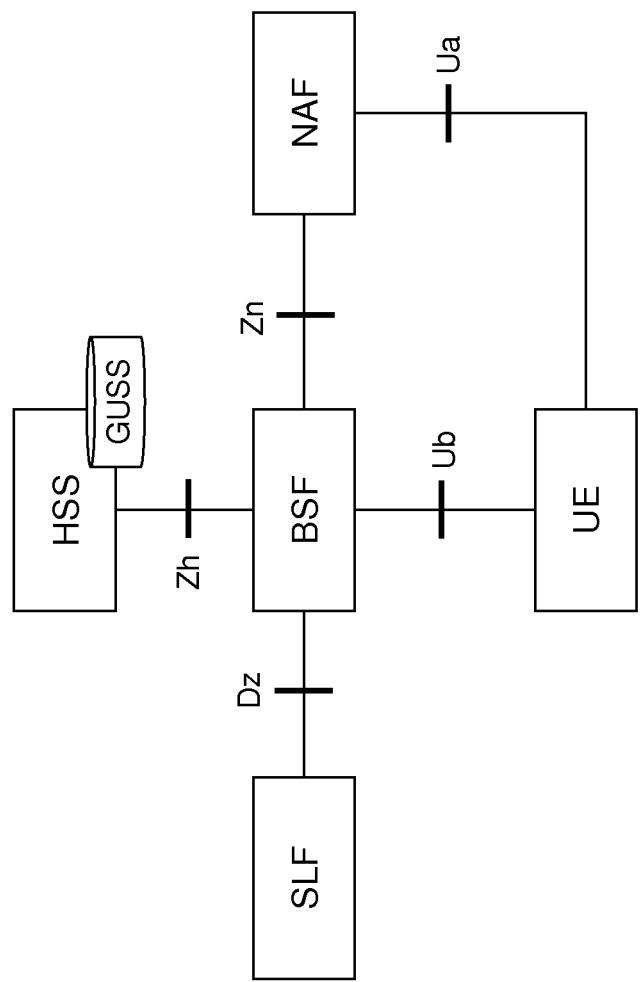
FIG. 1 illustrates schematically an example of the simple network model for the GBA.
Figure 2:
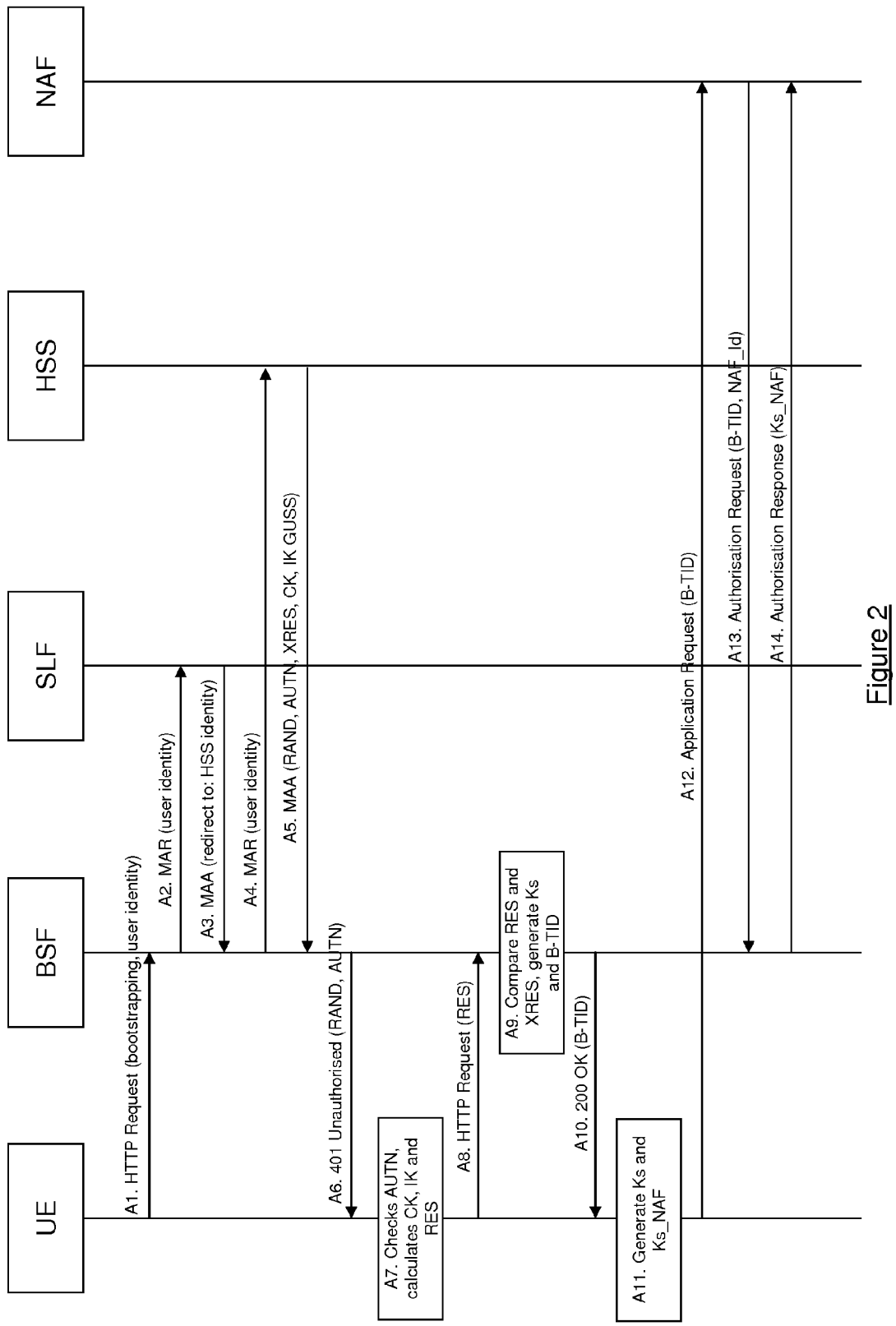
FIG. 2 illustrates an example signalling flow diagram of the bootstrapping mechanism provided by the GBA.
Figure 3:
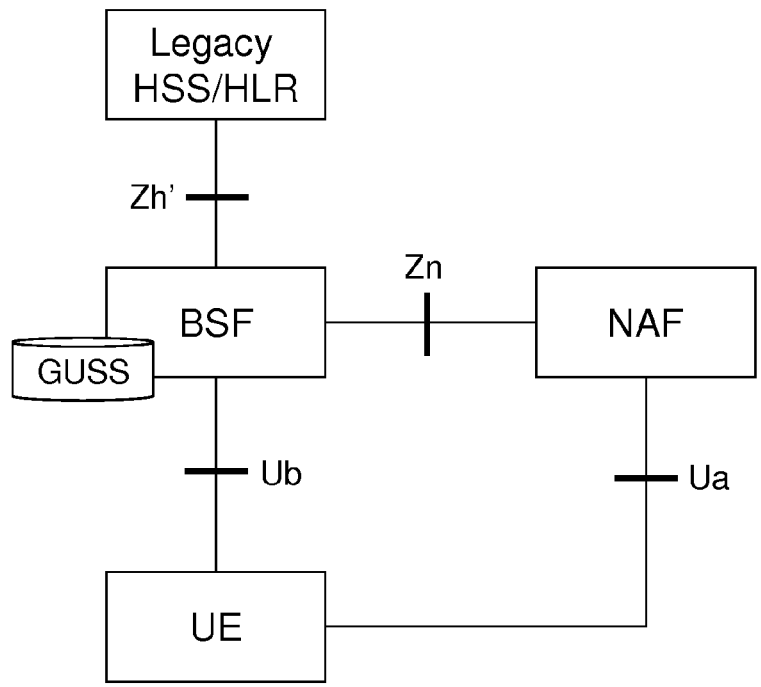
FIG. 3 illustrates schematically an example of the simple network model for the GBA when either a HLR or a HSS without Zh interface support is deployed.
Figure 4:
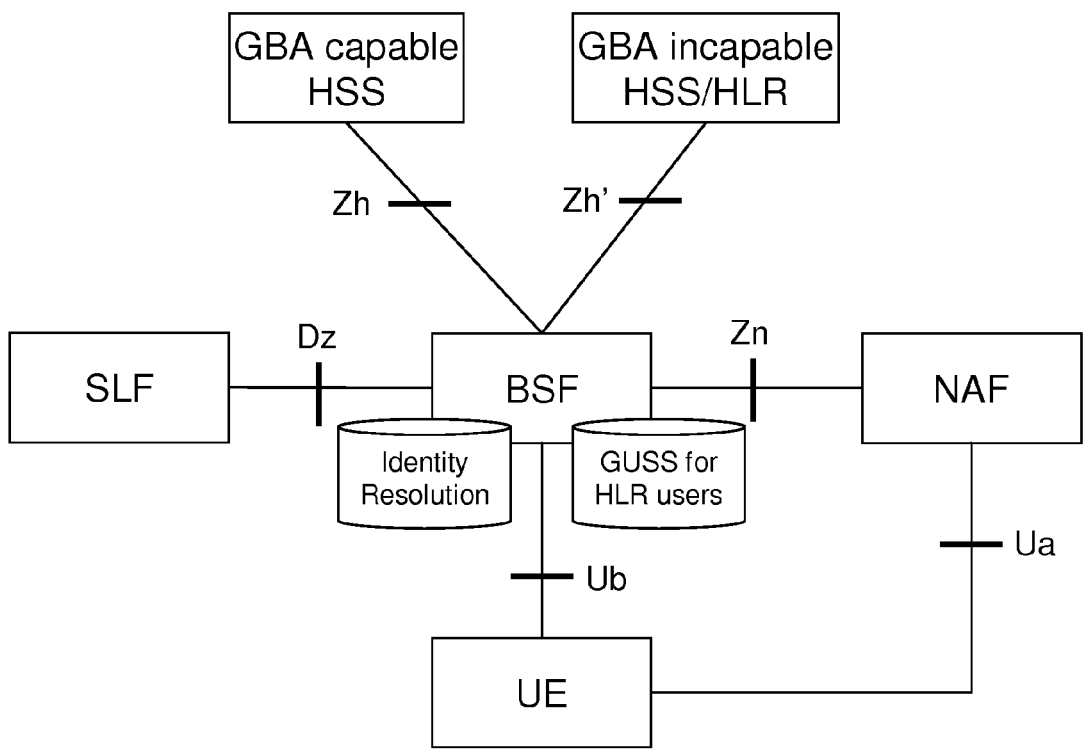
FIG. 4 illustrates schematically the network model for proposed by 3GPP TS 33.220 for supporting GBA during migration.
Figure 5:
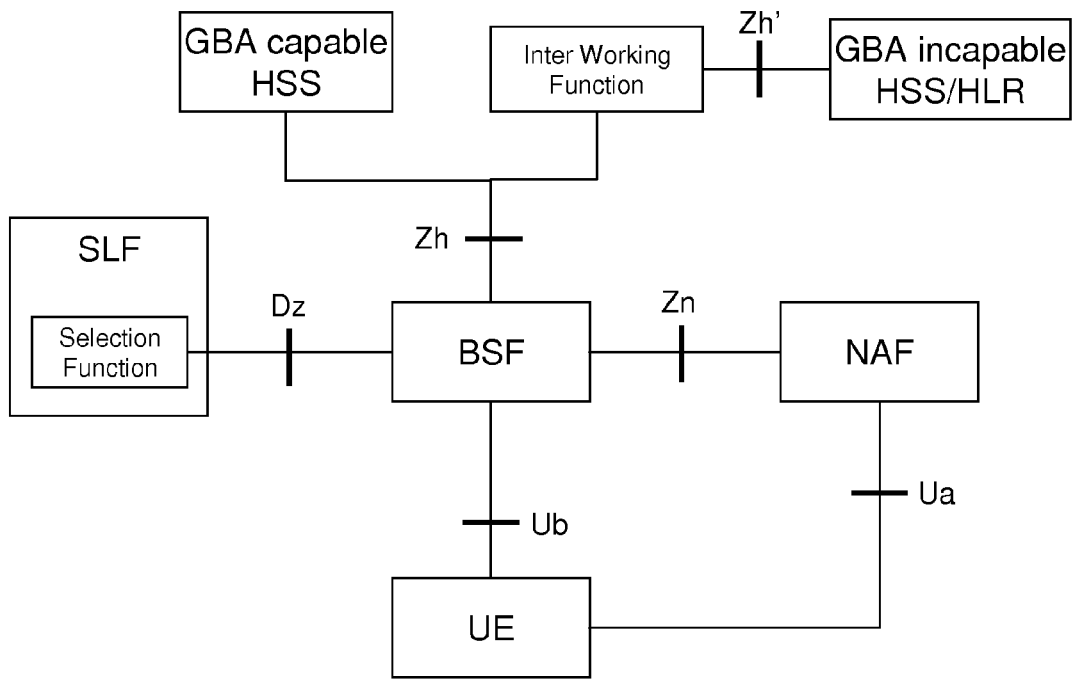
FIG. 5 illustrates schematically a network according to a first embodiment of the present invention.

The method described above could be implemented into a network in a number of ways. For example, and as illustrated in FIG. 5, the Selection Function could be implemented at an SLF, and the Inter Working Function could be implemented as a separate entity. The BSF would then always send the authentication request to the SLF, in the same way as it would in a network in which more than one GBA-capable HSS is deployed. The Selection Function at the SLF would then determine if the subscriber's authentication information is stored at a GBA-capable HSS, or at a GBA-incapable HLR/HSS.

As the Selection Function and the Interworking Function are implemented separately in this embodiment, if the Selection Function determines that the subscriber's authentication information is stored at a GBA-incapable HSS/HLR, then the Selection Function would be configured to respond to the authentication request with an implicit or explicit indication that the Zh' interface must be used. The BSF would then redirect the authentication request to the Inter Working Function, the address of which could be preconfigured at the BSF or could be provided by the Selection Function.

Figure 6:
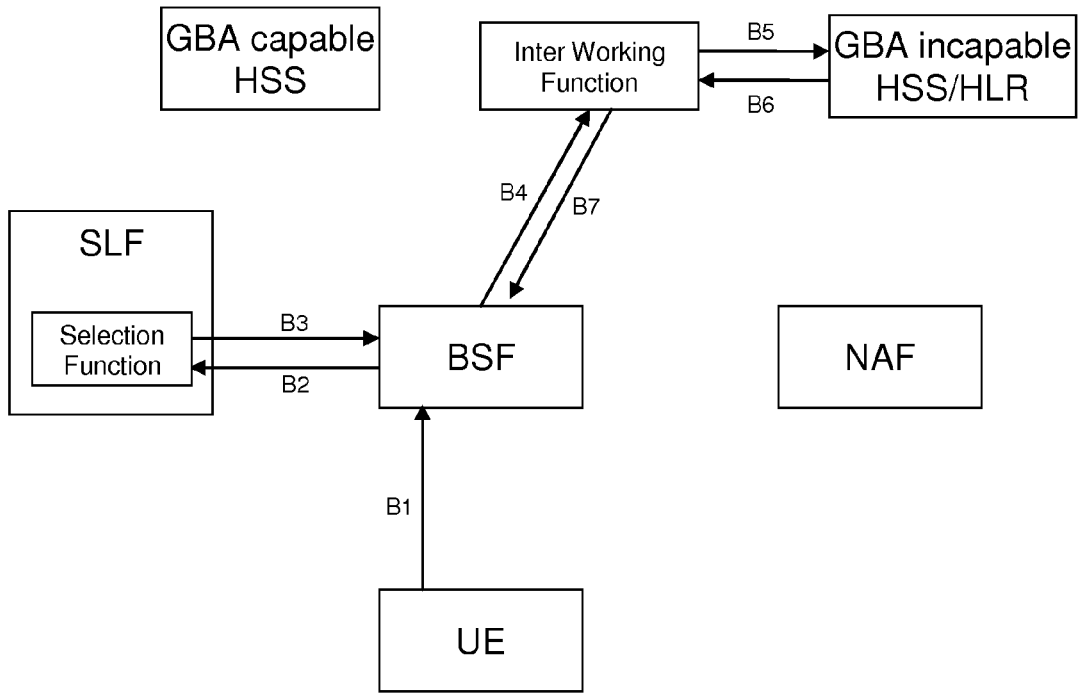
FIG. 6 illustrates the process of obtaining subscriber authentication information in the network of FIG. 5.

FIG. 6 illustrates the process of obtaining subscriber authentication information from a GBA-incapable HSS/HLR in such a network. The steps performed are as follows:

B1. A UE initiates the key generation process by sending a bootstrapping request containing a subscriber identity to the BSF over the Ub interface.

B2. The BSF queries the Selection Function by sending a an authentication request (i.e. a MAR message) to the SLF over the Dz interface.

B3. The Selection Function determines whether the subscriber's authentication information (i.e. AV) is stored at a GBA-capable HSS or at a GBA-incapable HSS/HLR and responds to the BSF.

B4. If the response from the Selection Function indicates that the subscriber's authentication information is stored at a GBA-incapable HSS/HLR, then the BSF resends the authentication request to the Inter Working Function. The address of the IWF can be provided by the Selection Function or can be pre-configured in the BSF.

B5. The Inter Working Function translates the authentication request into the corresponding MAP protocol message (i.e. a MAP_SEND_AUTH_INFO request), and sends the MAP message to the GBA-incapable HLR/HSS over the Zh' interface. The MAP message is routed to the appropriate HLR/HSS using the subscriber's IMSI.

B6. The GBA-incapable HLR/HSS responds to the MAP message with the subscriber's authentication information (i.e. in a MAP_SEND_AUTH_INFO response).

B7. The Inter Working Function receives the response from the GBA-incapable HLR/HSS and translates this MAP message into the corresponding authentication response (i.e. an MAA message). The Inter Working Function then sends the authentication g response, including the subscriber's authentication information, to the BSF.

For those subscribers whose authentication information is stored at a GBA-capable HSS, the response from the Selection Function in step B3 will include the identity of a GBA-capable HSS (identified in the Redirect-Host AVP). The BSF will then resend the authentication request to the GBA-capable HSS identified in the response, which will respond with the subscriber's authentication information, in accordance with standard procedures.

Figure 7:
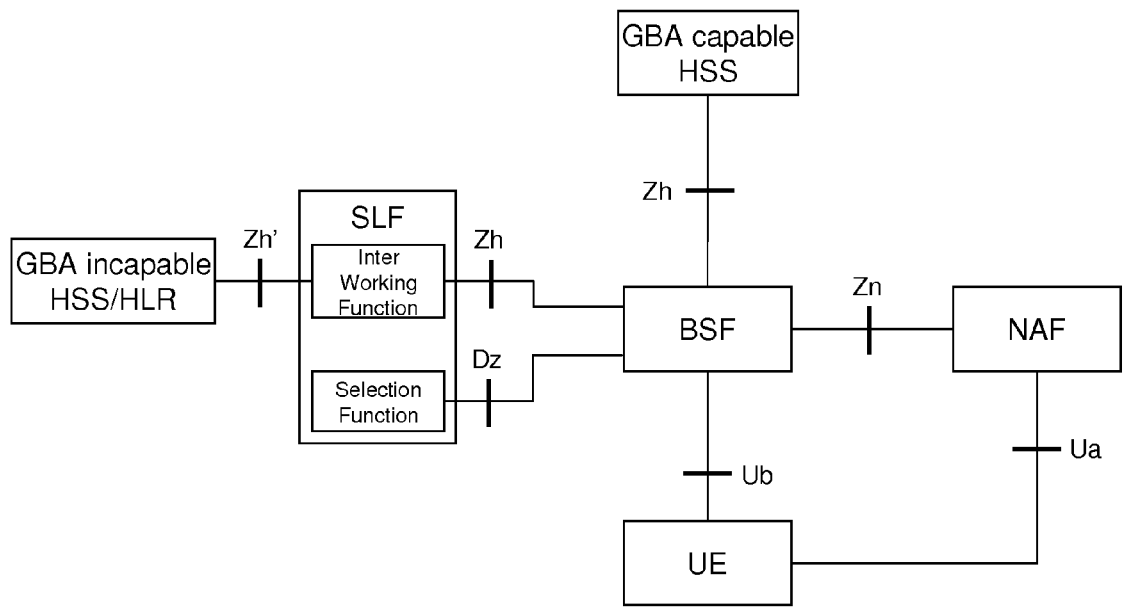
FIG. 7 illustrates schematically a network according to a second embodiment of the present invention.

As an alternative, FIG. 7 illustrates a network in which both the Selection Function and the Inter Working Function are implemented at an SLF. In such a network, if the Selection Function were to determine that the subscriber's authentication information is stored at a GBA-incapable HSS/HLR, then the Selection Function would forward the authentication request directly to the Inter Working Function, without the need to provide an indication to the BSF.

Figure 8:
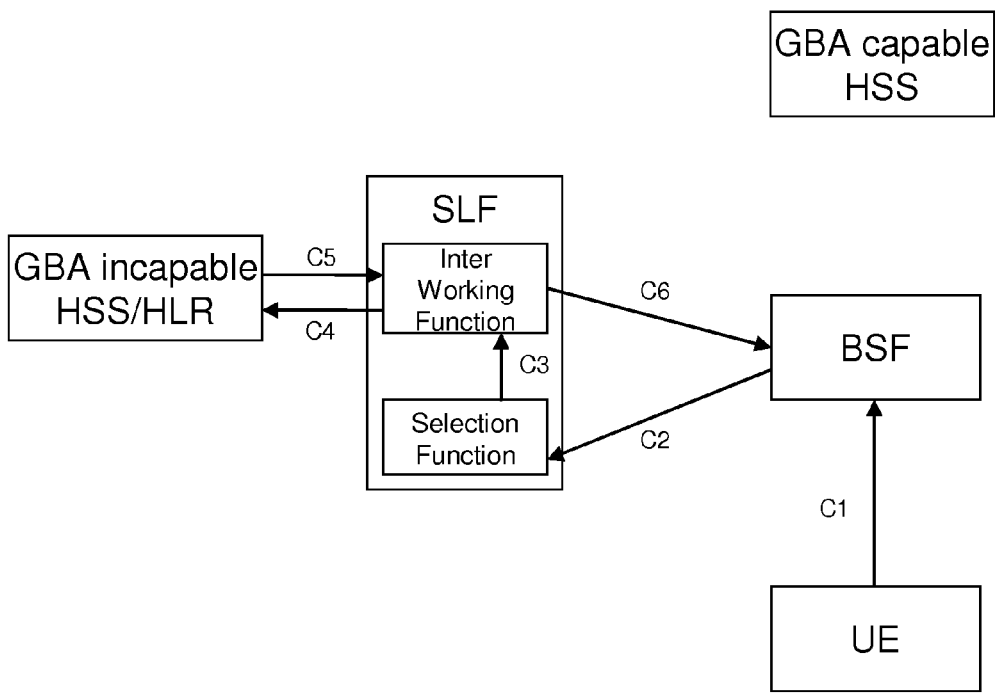
FIG. 8 illustrates the process of obtaining subscriber authentication information in the network of FIG. 7.

FIG. 8 illustrates the process of obtaining subscriber authentication information from a GBA-incapable HSS/HLR in such a network. The steps performed are as follows:

C1. A UE initiates the key generation process by sending a bootstrapping request containing a user identity to the BSF over the Ub interface.

C2. The BSF queries the Selection Function by sending an authentication request (i.e. a MAR message) to the SLF over the Dz interface.

C3. If the Selection Function determines that the subscriber's authentication information is stored at a GBA-incapable HSS/HLR, then the Selection Function forwards the bootstrapping request to the Inter Working Function.

C4. The Inter Working function translates the authentication request into the corresponding MAP protocol message, and sends the MAP message to the GBA-incapable HLR/HSS over the Zh' interface. The MAP message is routed to the appropriate HLR/HSS using the subscriber's IMSI.

C5. The GBA-incapable HLR/HSS responds to the MAP message with the subscriber's authentication information.

C6. The Inter Working Function receives the response from the GBA-incapable HLR/HSS and translates this MAP message into the corresponding authentication response. The Inter Working Function then sends the authentication response, including the subscriber's authentication information, to the BSF over the Zh interface.

Once again, if the Selection Function determines that the subscriber's authentication information is stored at a GBA-capable HSS, then the Selection Function will send a response to the BSF including the identity of a GBA-capable HSS. The BSF will then resend the authentication request to the GBA-capable HSS identified in the response, which will respond with the subscriber's authentication information in accordance with standard procedures.

Figure 9:
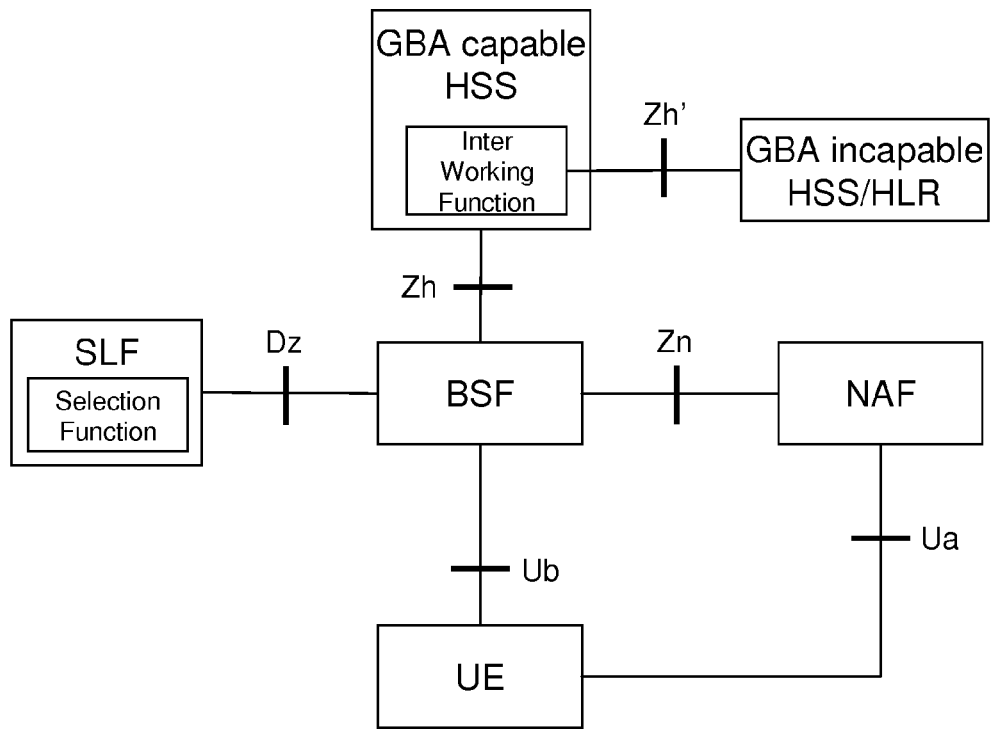
FIG. 9 illustrates schematically a network according to a third embodiment of the present invention.

As a further alternative, FIG. 9 illustrates a network in which the Selection Function is implemented at an SLF, and the Inter Working Function is implemented at a GBA-capable HSS. When implementing the Inter Working Function in a GBA-capable HSS the IWF may also be used to store the GUSS for subscribers handled by a GBA-incapable HLR/HSS. In particular, the HSS could be configured with a single GUSS profile for subscribers handled by a GBA-incapable HLR/HSS instead of an individual GUSS for these subscribers.

Figure 10:
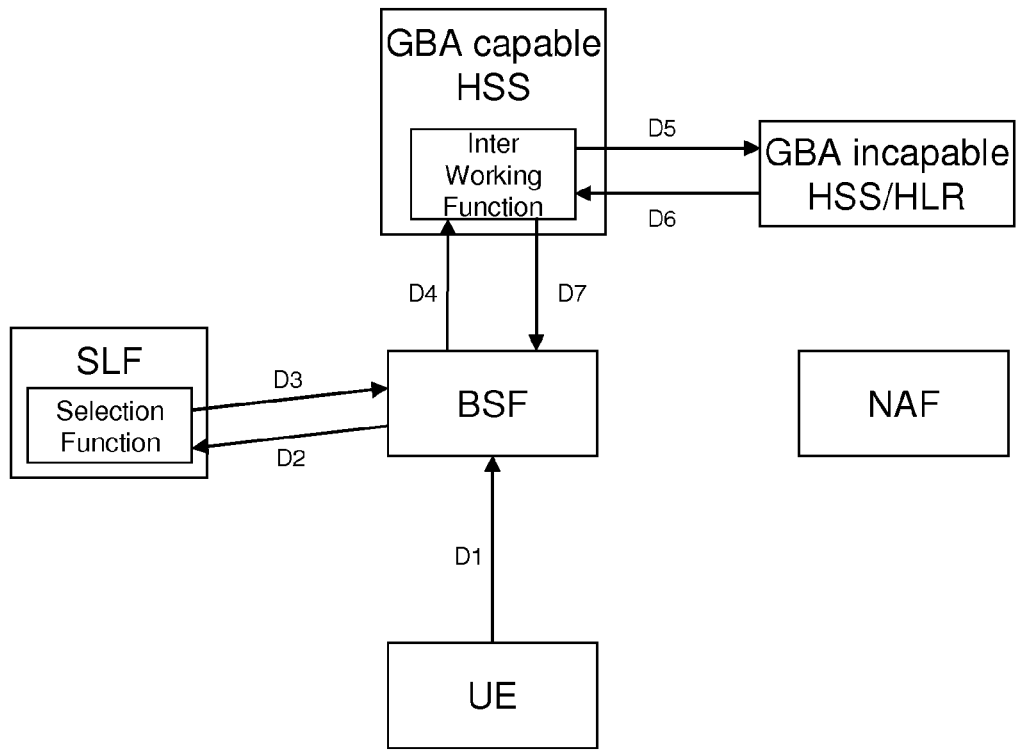
FIG. 10 illustrates the process of obtaining subscriber authentication information in the network of FIG. 9.

FIG. 10 illustrates the process of obtaining subscriber authentication information from a GBA-incapable HSS/HLR in such a network. The steps performed are as follows:

D1. A UE initiates the key generation process by sending a bootstrapping request containing a user identity to the BSF over the Ub interface.

D2. The BSF queries the Selection Function by sending an authentication request (i.e. a MAR message) to the SLF over the Dz interface.

D3. The Selection Function determines whether the subscriber's authentication information is stored at a GBA-capable HSS or at a GBA-incapable HSS/HLR and responds to the BSF.

D4. If the response from the Selection Function indicates that the subscriber's authentication information is stored at a GBA-incapable HSS/HLR, then the BSF resends the authentication request to the Inter Working Function. The address of the IWF can be provided by the Selection Function or can be pre-configured in the BSF.

D5. The Inter Working function translates the authentication request into the corresponding MAP protocol message, and sends the MAP message to the GBA-incapable HLR/HSS over the Zh' interface. The MAP message is routed to the appropriate HLR/HSS using the subscriber's IMSI.

D6. The GBA-incapable HLR/HSS responds to the MAP message with the subscriber's authentication information.

D7. The Inter Working Function receives the response from the GBA-incapable HLR/HSS and translates this MAP message into the corresponding authentication response. The Inter Working Function then sends the authentication g response, including the subscriber's authentication information, to the BSF over the Zh interface.

If the Selection Function determines that the subscriber's authentication information is stored at a GBA-capable HSS, then the Selection Function will send a response to the BSF including the identity of a GBA-capable HSS. The BSF will then resend the authentication request to the GBA-capable HSS identified in the response, which will respond with the subscriber's authentication information in accordance with standard procedures.

Furthermore, if there is the only a single GBA-capable HSS in the network, then the authentication request can be sent directly to the GBA-capable HSS, without the need to query the Selection Function. In such circumstances, if the subscriber's authentication information is stored at the GBA-capable HSS, then it will be able to directly respond to the request with the subscriber's authentication information. Alternatively, if the subscriber's authentication information is not stored at the GBA-capable HSS, then the Inter Working Function would translate the authentication request into the corresponding MAP protocol message, and send the MAP message to the GBA-incapable HLR/HSS over the Zh' interface. The Inter Working Function would then translate the MAP response message into the corresponding authentication response and send the bootstrapping response, including the subscriber's authentication information, to the BSF over the Zh interface.

Figure 11:
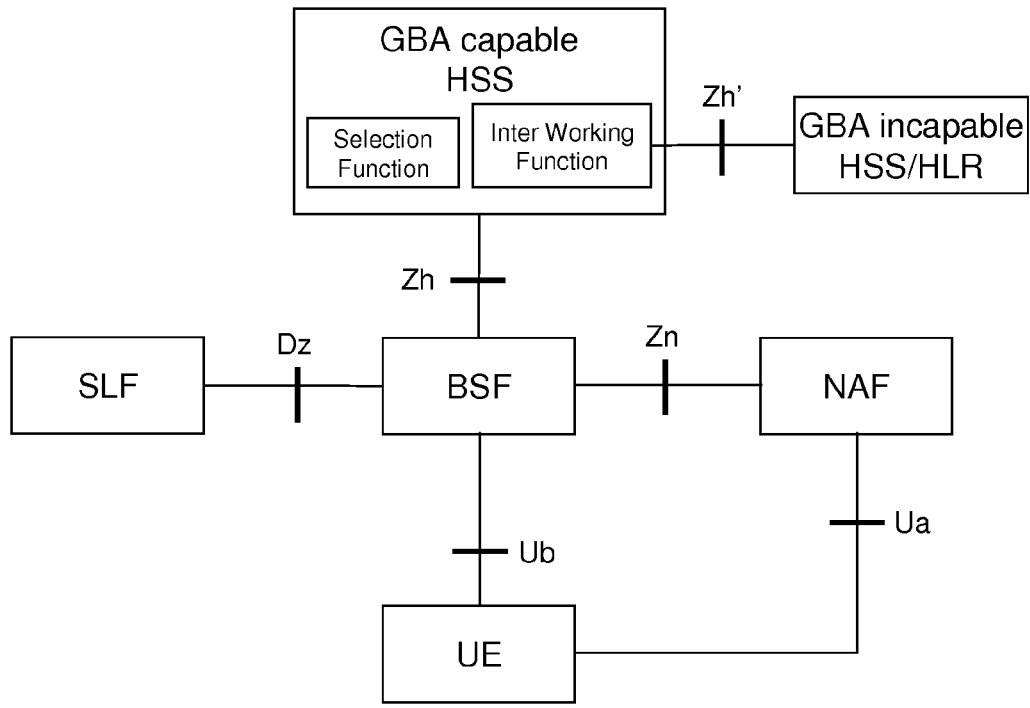
FIG. 11 illustrates schematically a network according to a fourth embodiment of the present invention.

As a yet further alternative, FIG. 11 illustrates a network in which both the Selection Function and the Inter Working Function are implemented at a GBA-capable HSS. In such a network, the BSF would then send all authentication requests to the GBA-capable HSS implementing the Selection and Inter Working functions. This GBA-capable HSS would then determine if the request can be handled locally within the HSS (i.e. if the request relates to a subscriber whose AV can be retrieved from this GBA-capable HSS), or if the request relates to a subscriber whose AV must be retrieved from a GBA-incapable HSS/HLR. If request belongs to a subscriber whose AV must be retrieved from a GBA-incapable HLR/HSS, then the authentication request is translated into a the corresponding MAP protocol request by the IWF and routed to the GBA-incapable HLR/HSS according to the subscriber's IMSI.

In addition, as previously noted, when implementing the IWF in a GBA-capable HSS, the IWF may also be used to store the GUSS for subscribers handled by a GBA-incapable HLR/HSS. In particular, the GBA-capable HSS could be configured with a single GUSS profile for subscribers handled by a GBA-incapable HLR/HSS instead of an individual GUSS for these subscribers. Implementing both the Selection Function and the IWF and providing GUSS support at a GBA-capable HSS provides that the BSF does not have to have any awareness of individual subscriber's, nor support the Zh' interface. Furthermore, the implementation of the Selection Function and IWF at a GBA-capable HSS would not require significant modification of the HSS, as 3GPP standards require that the HSS includes HLR functionality, and therefore that standard MAP operations are used with this functionality. In addition, if the network is configured with only a single GBA-capable HSS, and this HSS was also configured to provide the Selection and Inter Working functions, then the network will not require an SLF, and the BSF need only be configured to send all requests towards this HSS.

Figure 12:
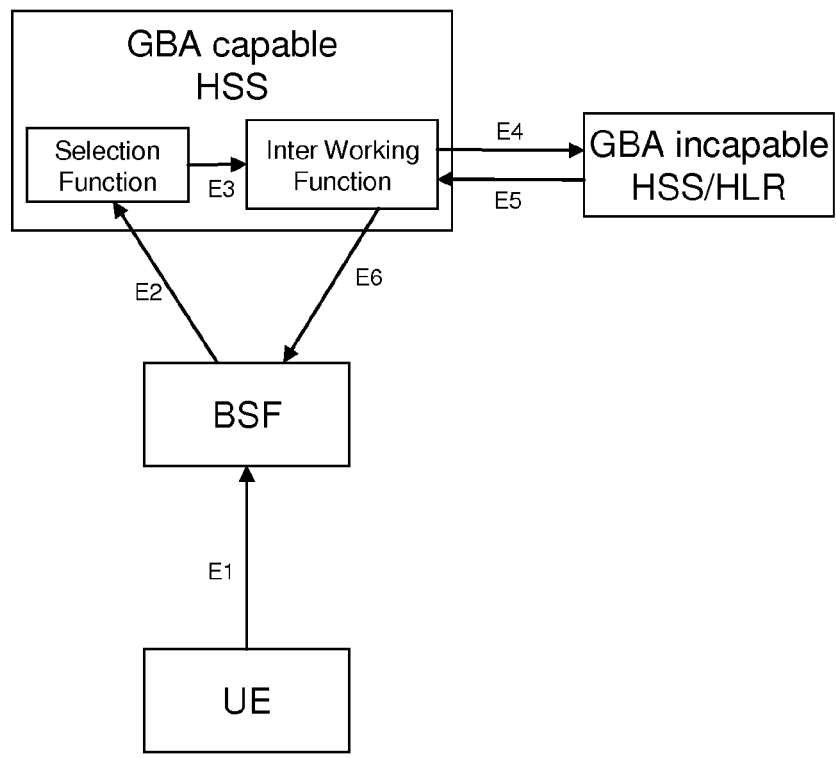
FIG. 12 illustrates the process of obtaining subscriber authentication information in the network of FIG. 9.

FIG. 12 illustrates the process of obtaining subscriber authentication information from a GBA-incapable HSS/HLR in such a network. The steps performed are as follows:

E1. A UE initiates the key generation process by sending a bootstrapping request containing a user identity to the BSF over the Ub interface.

E2. The BSF queries the Selection Function by sending an authentication request (i.e. a MAR message) to the GBA-capable HSS over the Zh interface.

E3. If the Selection Function determines that the subscriber's authentication information is stored at a GBA-incapable HSS/HLR, then the Selection Function forwards the bootstrapping request to the Inter Working Function.

E4. The Inter Working function translates the authentication request into the corresponding MAP protocol message, and sends the MAP message to the GBA-incapable HLR/HSS over the Zh' interface. The MAP message is routed to the appropriate HLR/HSS using the subscriber's IMSI.

E5. The GBA-incapable HLR/HSS responds to the MAP message with the subscriber's authentication information.

E6. The Inter Working Function receives the response from the GBA-incapable HLR/HSS and translates this MAP message into the corresponding authentication response. The Inter Working Function then sends the authentication response, including the subscriber's authentication information, to the BSF over the Zh interface.

If the Selection Function determines that the subscriber's authentication information is stored at another GBA-capable HSS, then the Selection Function will send a response to the BSF including the identity of a GBA-capable HSS. The BSF will then resend the authentication request to the GBA-capable HSS identified in the response, which will respond with the subscriber's authentication information in accordance with standard procedures. Alternatively, if the Selection Function determines that the subscriber's authentication information is stored at the GBA-capable HSS providing the Selection Function (for example, if this is the only GBA-capable HSS in the network), then the GBA-capable HSS providing the Selection Function can send a response to the BSF including the subscriber's authentication information.

In order to determine if the subscriber's authentication information is stored at a GBA-capable HSS or at a GBA-incapable HLR/HSS, the Selection Function may only be configured with information identifying which subscribers have their profile information stored at a GBA-capable HSS. As such, if a subscriber identity is resolved to a subscriber whose profile information is stored at a GBA-capable HSS, then the Selection Function would send a response redirecting the request to the appropriate HSS, in accordance with prior art procedures. If the subscriber's profile information is stored in a GBA-incapable HLR/HSS, then the Selection Function would not be able to resolve the user identity to a GBA-enabled HSS, and might use this to implicitly determine that the subscriber's profile information is stored in a GBA-incapable HLR/HSS. However, if the Selection Function is implemented at the SLF, then it would also need to be configured with information identifying which subscribers are managed in a GBA-capable HSS, but whose AV must be retrieved from a GBA-incapable HSS/HLR. For example, this would be the case when a user has an IMS subscription but the user has a USIM, as the subscriber's AV would then need to be retrieved from a GBA-incapable HLR. The Selection Function at the SLF would then be required to be aware that the Zh' interface must be used for any such subscribers.

In order to explicitly provide the indication that the Zh' interface must be used, the Selection Function could be configured to send a response to the BSF, over the Dz interface, in the form of a Diameter message including a new Zh' indicator (i.e. in the form of new specific AVP within the message). For user's whose subscriber profile information is stored in a GBA-incapable HSS, this Diameter message could also have its Result-Code AVP (see IETF RFC 3588) set to one of the values within the Success category. This Diameter message would then omit the identity of the HSS, but could include the address of the IWF. For user's whose subscriber profile information is stored in a GBA-incapable HLR, the Diameter message could then have its Result-Code AVP set to one of the values within the Failure category.

To send an implicit indication, the Selection Function could be configured to send a response to the BSF over the Dz interface in the form of a Diameter message with its Result-Code AVP set to one of the values within the Failure category, irrespective of whether the subscriber's profile information is stored in a GBA-incapable HSS or a GBA-incapable HLR. The BSF would then be configured to interpret this as an indication that the Zh' interface must be used to obtain the AV for the subscriber, and therefore that it should contact the Inter Working Function.

Alternatively, if the Selection Function were to be provided by the SLF and the IWF were to be provided by a GBA-capable HSS, then this Diameter message could have its Result-Code AVP set to one of the values within the Success category and include the address of the GBA-capable HSS providing the IWF. In this scenario, the BSF would behave as if the subscriber's AV is to be provided by the GBA-capable HSS identified in the response from the SLF, and would not need to be pre-configured with the address of the IWF.

The methods described above provide that network operators can migrate from GBA incapable HSSs/HLRs to GBA capable HSSs gradually and with a minimum impact on the network entities involved. This reduces the costs and effort for the network operator. The centralisation of a Selection Function at either the SLF or at a HSS provides that the BSF does not need to be configured with subscriber information, as currently suggested by the standards. In addition, the provision of an IWF provides that the BSF does not need to support the MAP protocol for the Zh' interface. Furthermore, if the Selection Function and the IWF are both implemented at a GBA-capable HSS, then this invention provides that the BSF only needs to send Diameter requests on the Zh interface to this HSS, further reducing the burden on the BSF. The IWF, when implemented at a GBA-capable HSS, could also store the GUSS for subscribers whose profile information is stored in a GBA-incapable HSS/HLR. This would provide GUSS support for these subscribers whilst still maintaining the BSFs user independence.

As opposed to the monolithic network architecture described in relation to the above embodiments, a network may alternatively make use of a Data Layer Architecture. In the Data Layer Architecture a Common User Database acts a central storage point for subscriber data that is usually stored at the HSS, AUC, SLF, HLR or Application Servers in a monolithic network. The Data Layer Architecture also includes a number of Front Ends (FEs) each of which implement the logic of each application or service. For example, the Data Layer Architecture will include at least one Front End for each HSS, AUC, SLF, HLR or Application Server. These Front Ends provide an interface to the Common User Database in order to obtain subscriber data and perform all the required logic to operate on said subscriber data, which may result in modifications of the subscriber data to be updated towards the Common User Database.

In a network making use of the Data Layer Architecture the SLF acts as a proxy providing load balancing for multiple HSS-FEs. As such, the SLF will not manage routing tables for resolving subscriber identities to a particular HSS-FE, as any GBA-capable HSS-FE will be able to obtain authentication information for any subscriber from the Common User Database. Furthermore, it is likely that not all HSS-FEs will support GBA. As such, for a subscriber whose authentication information is handled in a GBA-incapable HLR/HSS, and stored in the Common User Database, the SLF will receive an unsuccessful response from said HSS-FE and will treat this as an implicit indication that the subscriber's authentication information is handled at a GBA-incapable HLR/HSS. In such circumstances, the Inter Working Function could be implemented either at the SLF or at a separate entity.

If the Inter Working Function were to be implemented at the SLF, upon receipt of an unsuccessful response from a HSS-FE, the Inter Working Function at the SLF could then translate the authentication request into the corresponding MAP protocol message and send this to the GBA-incapable HLR/HSS over the Zh' interface. Alternatively, if the Inter Working Function were to be implemented at a separate entity, upon receipt of an unsuccessful response from a HSS-FE, the SLF would forward the unsuccessful response to the BSF over the Dz interface. The BSF would then treat this as an implicit indication that the Zh' interface must be used, and would send the authentication request to the Inter Working Function.

Figure 13:
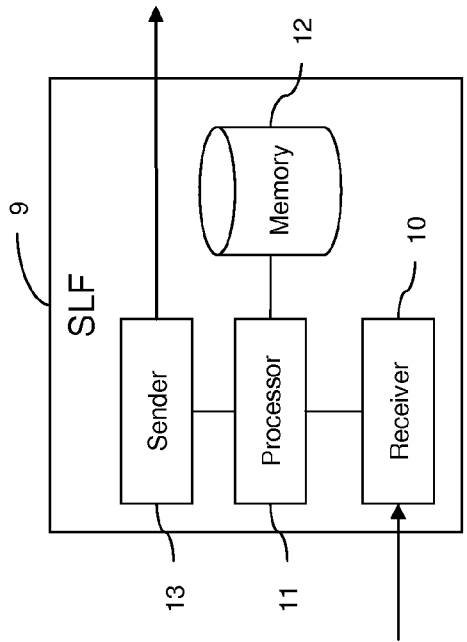
FIG. 13 illustrates schematically an example of a BSF according to an embodiment of the present invention.

FIG. 13 illustrates schematically an example of a BSF 1 suitable for implementing the method described above. The BSF 1 can be implemented as a combination of computer hardware and software. The BSF 1 comprises a receiver 2, a processor 3 and a transmitter or sender 4. A request from a subscriber terminal (i.e. a terminal being used by a subscriber) to use the GBA is received by the receiver 2, the request includes an identity of the subscriber. This request is processed and an authentication request for authentication information is generated by processor 3, this request also includes an identity of the subscriber. The authentication request is then sent to the Selection Function by sender 4. As described above, the Selection Function can be provided at either the SLF or at a GBA-capable HSS. If the Selection Function determines that the subscriber's authentication information is stored at a GBA-incapable subscriber register (i.e. a HLR/HSS), then the Inter Working Function must be used to retrieve the subscriber's authentication information.

If the Inter Working Function is provided at the same node as the Selection Function (i.e. at the SLF or at a GBA-capable HSS), then the BSF 1 will receive an authentication response on receiver 2 directly from the Inter Working Function. The authentication response will include the subscriber's authentication information obtained from the GBA-incapable subscriber register. Alternatively, if the Inter Working Function is provided at a different node to the Selection Function (i.e. at a GBA-capable HSS or at a separate entity), then the BSF 1 will receive a response on receiver 2 from the Selection Function with an indication that the authentication information of the subscriber is stored at one of the one or more GBA-incapable subscriber registers. The BSF 1 will then be forward the authentication request using sender 4 the Inter Working Function. An authentication response from the Inter Working Function including the subscriber authentication information obtained from the GBA-incapable subscriber register will then be received by receiver 2.

Figure 14:
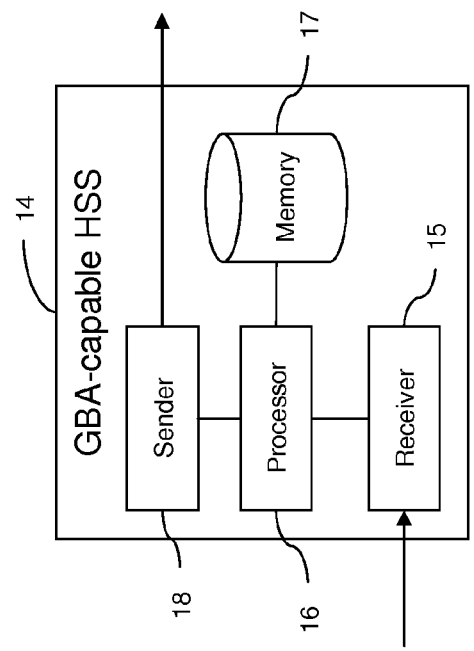
FIG. 14 illustrates schematically an example of an Inter Working Function according to an embodiment of the present invention.

As noted above, if the Selection Function determines that the subscriber's authentication information is stored at a GBA-incapable subscriber register (i.e. a HLR/HSS), then the Inter Working Function must be used to retrieve the subscriber's authentication information. FIG. 14 illustrates schematically an example of an Inter Working Function 5 suitable for implementing the method described above. The Inter Working Function 5 can be implemented as a combination of computer hardware and software. As described above, the Inter Working Function 5 can be provided at either a GBA-capable HSS or by a separate entity.

The Inter Working Function 5 comprises a receiver 6, a processor 7 and a transmitter or sender 8. An authentication request for authentication information is received from a BSF by receiver 6. The authentication request includes an identity of a subscriber. The processor 7 translates the authentication request into the corresponding MAP message, which is transmitted to a GBA-incapable subscriber register by the sender 8. A MAP response is received from the GBA-incapable subscriber register by receiver 6, the response including the subscriber's authentication information. The processor 7 translates the MAP response into the corresponding authentication response, which is then transmitted back to the BSF by sender 8.

Figure 15:
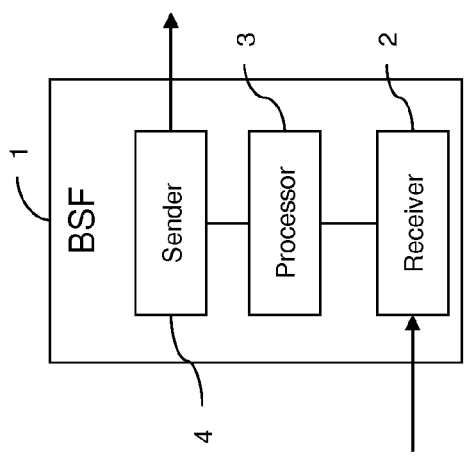
FIG. 15 illustrates schematically an example of an SLF according to an embodiment of the present invention.

FIG. 15 illustrates schematically an example of an SLF 9 suitable for implementing the method described above. The SLF 9 can be implemented as a combination of computer hardware and software. The SLF 9 comprises a receiver 10, a processor 11, a memory or database 12 and a transmitter or sender 13. An authentication request for authentication information is received from a BSF by receiver 10. The processor 11 determines if the authentication information of the subscriber is stored at a GBA-capable subscriber register or at a GBA-incapable subscriber register. This can be achieved, for example, by accessing the memory 12, which stores information relating subscriber identities to the GBA-capable subscriber registers which store their authentication information.

If the SLF 9 only provides the Selection Function, and the Selection Function determines that the subscriber's authentication information is stored at a GBA-incapable subscriber register, then the SLF 9 will send a response to the BSF using sender 13, including an indication that the authentication information of the subscriber is stored at one of the one or more GBA-incapable subscriber registers.

Alternatively, if the SLF 9 provides both the Selection Function and the Inter Working Function, then the processor 11 translates the authentication request into the corresponding MAP message. This MAP message is then transmitted to a GBA-incapable subscriber register by the sender 13. A MAP response is received from the GBA-incapable subscriber register by receiver 10, including the subscriber's authentication information. The processor 11 translates the MAP response into the corresponding authentication response, which is then transmitted back to the BSF by sender 13.

Figure 16:
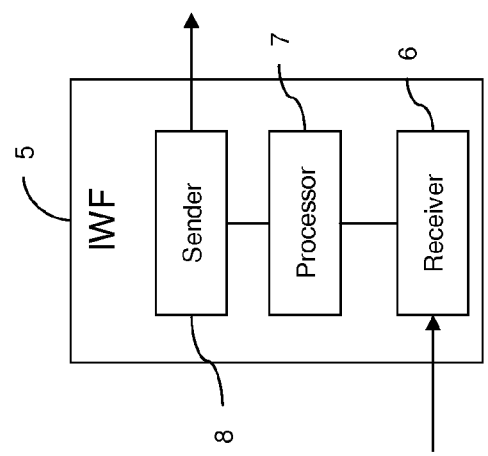
FIG. 16 illustrates schematically an example of an GSA-capable HSS 14 according to an example embodiment.

FIG. 16 illustrates schematically an example of an GBA-capable HSS 14 suitable for implementing the method described above, wherein both the Selection Function and the Inter Working Function are provided by the GBA-capable HSS 14. The GBA-capable HSS 14 can be implemented as a combination of computer hardware and software. The GBA-capable HSS 14 comprises a receiver 15, a processor 16, a memory or database 17 and a transmitter or sender 18. An authentication request for authentication information is received from a GBA-capable HSS 14 on receiver 15. The processor 16 determines if the authentication information of the subscriber is stored at a GBA-capable subscriber register or at a GBA-incapable subscriber register. This can be achieved, for example, by accessing the memory 17, which stores information relating subscriber identities to the GBA-capable subscriber registers which store their authentication information.

If the processor 16 determines that the subscriber's authentication information is stored at a GBA-incapable subscriber register, then the processor 16 translates the authentication request into the corresponding MAP message. This MAP message is then transmitted to a GBA-incapable subscriber register by the sender 18. A MAP response is received from the GBA-incapable subscriber register by receiver 15, including the subscriber's authentication information. The processor 16 translates the MAP response into the corresponding authentication response, which is then transmitted back to the BSF by sender 18.

It will be appreciated by the person of skill in the art that various modifications may be made to the above-described embodiments without departing from the scope of the present invention. For example, the concepts described here can be applied to any HSS/HLR interface. 3GPP are currently working on the definition of a Diameter version of the Lh interface between a Gateway Mobile Location Centre (GMLC) and the HSS/HLR. This interface currently uses the MAP protocol. The introduction of a Selection Function and an Inter Working Function would enable network operators to gradually migrate from the MAP version of the Lh interface to a Diameter version, with a minimum impact on the entities involved.

The invention claimed is:

1. A method of obtaining authentication information for use in a Generic Bootstrapping Architecture, GBA, employed in a network with one or more GBA-capable subscriber registers and one or more GBA-incapable subscriber registers, the method comprising:
 at a Bootstrapping Server Function, upon receipt of a bootstrapping request from a subscriber terminal, sending an authentication request for authentication information including an identity of a subscriber to a selection function;
 at the selection function, determining if the authentication information of the subscriber is stored at one of the one or more GBA-capable subscriber registers or at one of the one or more GBA-incapable subscriber registers;
 if it is determined that the authentication information of the subscriber is stored at one of the one or more GBA-incapable subscriber registers, communicating the authentication request to an inter working function; and
 at the inter working function, sending a Mobile Application Part, MAP, protocol message corresponding to the authentication request towards the GBA-incapable subscriber register, receiving a MAP response from the GBA-incapable subscriber register, and sending an authentication response corresponding to the received MAP response to the Bootstrapping Server Function;
 wherein the selection function is provided by either of a Subscriber Locator Function and one of the one or more GBA-capable subscriber registers, and the inter working function is provided by either of the Subscriber Locator Function and one of the one or more GBA-capable subscriber registers.

2. The method as claimed in claim 1, wherein the step of communicating the determination to an inter working function comprises:
 at the selection function, forwarding the authentication request to the inter working function.

3. The method as claimed in claim 2, wherein both the selection function and the inter working function are provided at one of the one or more GBA-capable subscriber registers.

4. The method as claimed in claim 2, wherein both the selection function and the inter working function are provided at the Subscriber Locator Function.

5. The method as claimed in claim 1, wherein the step of communicating the authentication request to an inter working function comprises:
 at the selection function, sending to the Bootstrapping Server Function an indication that the authentication information of the subscriber is stored at one of the one or more GBA-incapable subscriber registers; and
 at the Bootstrapping Server Function, forwarding the authentication request to the inter working function.

6. The method as claimed in claim 5, wherein the inter working function is provided at one of the one or more GBA-capable subscriber registers and the selection function is provided at the Subscriber Locator Function.

7. The method as claimed in claim 1, wherein the step of determining if the authentication information of the subscriber is stored at one of the one or more GBA-capable subscriber registers or at one of the one or more GBA-incapable subscriber registers comprises:
 determining if the authentication information of the subscriber is stored at one of the one or more GBA-capable subscriber registers; and
 if not, implicitly determining that the authentication information of the subscriber is stored at one of the one or more GBA-incapable subscriber registers.

8. The method as claimed in claim 1, and further comprising, if it is determined that the authentication information of the subscriber is stored at one of the one or more GBA-incapable subscriber registers, retrieving the subscribers GBA User Security Settings, GUSS, from one of the selection function and the inter working function.

9. The method as claimed in claim 8, wherein the GUSS is stored at one of:
 the entity providing the selection function; and
 the entity providing the inter working function.

10. The method as claimed in claim 1, wherein the GBA-capable subscriber registers are Home Subscriber Servers supporting Diameter protocol and capable of communicating with the Bootstrapping Server Function, and wherein the GBA-incapable subscriber registers are Home Subscriber Servers or Home Location Registers supporting MAP protocol and incapable of communicating with the Bootstrapping Server Function.

11. An apparatus configured to operate as an inter working function for use in a Generic Bootstrapping Architecture, GBA, employed in a network comprised of one or more GBA-incapable subscriber registers, the apparatus comprising:
- a first receiver configured to receive, from a Bootstrapping Server Function, an authentication request for authentication information including an identity of a subscriber;
- a processor configured to translate the authentication request into a corresponding Mobile Application Part, MAP, protocol message;
- a first sender configured to send the MAP protocol message corresponding to the authentication request towards one of the one or more GBA-incapable subscriber registers;
- a second receiver configured to receive a MAP protocol response from the GBA-incapable subscriber register including the subscriber authentication information;
- the processor being further configured to translate the MAP response into a corresponding authentication response; and
- a second sender configured to send the authentication response corresponding to the received MAP response to the Bootstrapping Server Function;

wherein the inter working function is provided by either of a Subscriber Locator Function and a GBA-capable subscriber register employed in the network.

* * * * *